३,२८५,८९९
METHOD FOR CONTINUOUSLY DISCHARGING THE CONTENTS OF A PRESSURIZED VESSEL
Clarence G. Houser and William E. Payne, Bartlesville, Okla., assignors to Phillips Petroleum Company, a corporation of Delaware
Filed Aug. 30, 1962, Ser. No. 220,457
3 Claims. (Cl. 260—93.7)

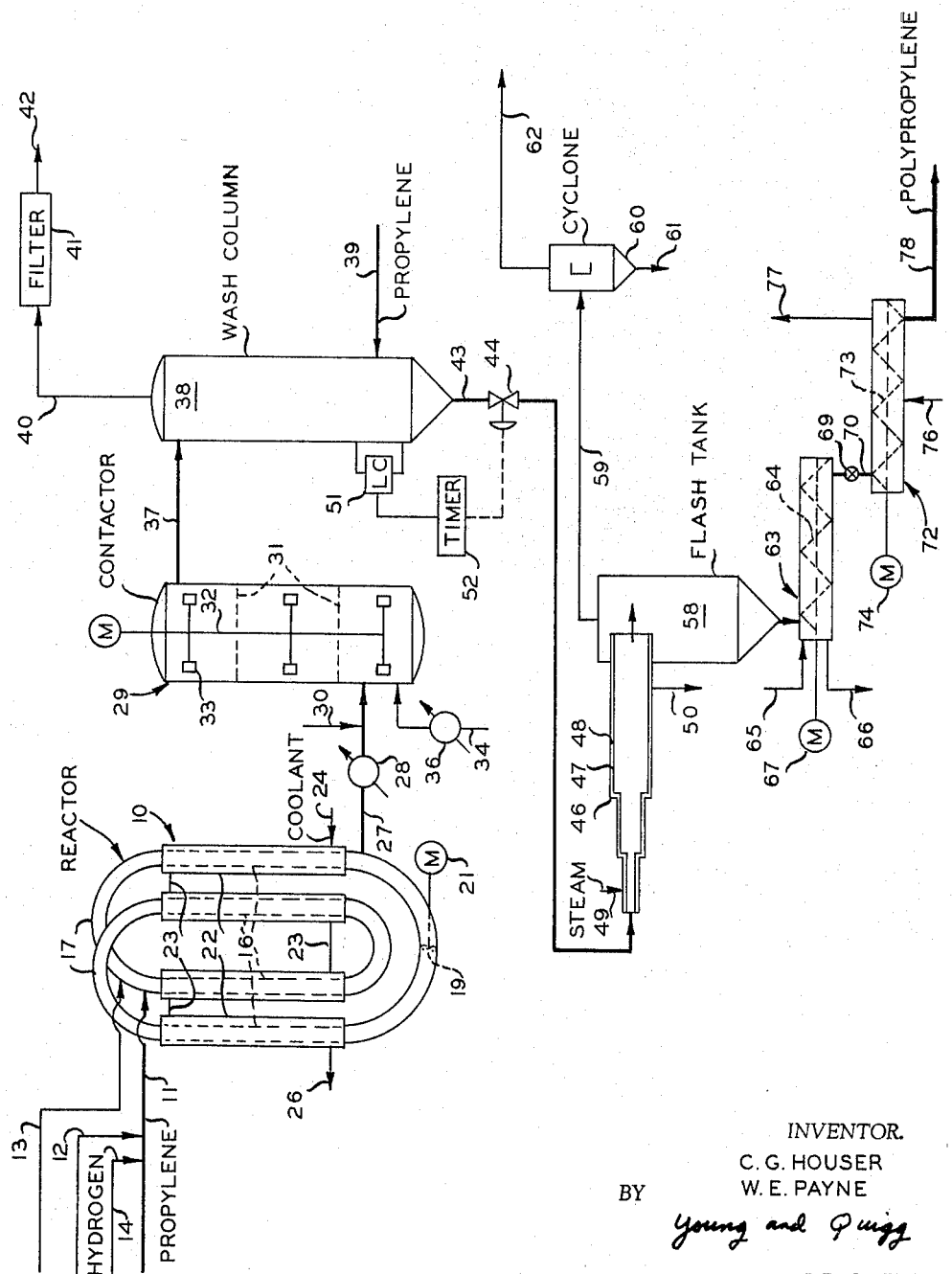

This invention relates to a method for continuously discharging the contents of a pressurized vessel. In another aspect, the invention relates to a method for the removal of a liquid-solids slurry from a pressurized zone to a zone at substantially atmospheric pressure. In another aspect, the invention relates to a method for the separation of liquid from a liquid-solids slurry.

The continuous removal of the contents of a pressurized vessel is frequently a difficult problem since it is usually desirable to remove said contents, e.g., liquids, with a minimum loss of pressure within the vessel itself. The problem is particularly aggravated when the contents comprise a liquid-solids slurry comprising a reaction product and when any reduction in pressure would alter the chemical reaction. The presence of a solid in the liquid frequently aggravates the problem because of possible polymer deposition on the downstream surfaces which tend to increase the maintenance cost. One example of such a reaction process is the polymerization of olefins to produce a solid particle form polymer which is then preferably removed from the reaction zone substantially continuously without a substantial reduction in the reaction zone pressure. One method of carrying out the particle form polymerization of olefins is described in the copending application of Donald R. Norwood, Serial No. 819,391, filed June 10, 1959, now abandoned. In this copending application a method and apparatus are described for reducing the fouling of reaction surfaces by carrying out the polymerization reaction in a tubular closed loop reaction zone with smooth surfaces. The catalyst, liquid diluent and hydrocarbon reactants are continuously moved through the reaction zone at a velocity sufficient to prevent polymer deposition and in the highly turbulent flow range. Solid particle form product is withdrawn from the reaction zone. Since this particle form product contains catalyst in a liquid diluent, it is then sometimes necessary to treat the polymer for removal of catalyst residues, such as by passing the resultant slurry into a contacting zone or treatment zone with an extractant for said residue. The treated polymer with accompanying diluent is then passed into a wash column where it is contacted countercurrently with an inert hydrocarbon diluent, preferably the same diluent as employed in the reaction zone, to wash out the accompanying liquid. It has heretofore been the practice to discharge the polymer particles and their accompanying wash liquid from this zone into a flash tank maintained at reduced pressure, e.g., substantially atmospheric, wherein the diluent is flashed off and the polymer is recovered from the lower portion thereof. However, it has been found that small amounts of soluble polymer remaining in the slurry will plate out on the flash tank walls and in the conduits leading therefrom causing bridging or plugging.

It is an object of this invention to provide an improved method for the removal of at least a portion of the contents of a pressurized vessel.

It is another object of the invention to provide an improved method for the recovery of solids from a pressurized vessel.

It is another object of the invention to provide an improved method for the separation of liquid from a liquid-solids slurry.

Yet another object of the invention is to provide an improved method for the recovery of particulate form polymers from a hydrocarbon slurry thereof maintained under superatmospheric pressure.

These and other objects of the invention will become more readily apparent from the following detailed description, discussion and claims.

The foregoing objects are broadly accomplished by removing from a zone of high pressure a slurry of a polyolefin in an inert liquid hydrocarbon diluent, said slurry being at superatmospheric pressure sufficient to maintain said diluent in liquid phase, by the method comprising vaporizing said diluent by discharging said slurry from said zone of high pressure through a heated confined zone maintained at reduced pressure so as to form a suspension of substantially dry particles in the resulting vapor, discharging said suspension into a solids separating zone maintained at substantially atmospheric pressure and recovering therefrom solid polyolefin product.

In one aspect of the invention, the confined zone provides a progressively larger cross-sectional area for the passage of solids and vapor therethrough so as to permit expansion of the liquid diluent as it vaporizes and also to provide more heat transfer area per unit of length.

It has been found that the high velocity of the polymer in the transfer line will prevent the formation and sticking of aggregates of polymer on the walls of the transfer conduit and the flash zone. In addition, by thus operating, it is possible to reduce the pressure quite simply from quite elevated levels to substantially atmospheric in one simple process step without the necessity for the provision of complicated valves subsequent to the flash tank.

The method of this invention is broadly applicable to any process requiring the continuous discharge of at least the fluid portion of the contents of the vessel maintained at superatmospheric pressure to a zone of lesser pressure with a minimum reduction of pressure within the vessel.

For purposes of simplification, the invention is described with reference to a particular process and apparatus for the polymerization of propylene to produce particle formed polypropylene in a continuous path loop reactor such as described in the copending application of Donald D. Norwood, Serial No. 819,391, filed June 10, 1959, and the continuation-in-part application, Serial No. 179,268, filed February 26, 1962.

The solids polymers which are treated in accordance with the present process are generally prepared from mono-1-olefins. The invention is broadly applicable to the treatment of polymers of mono-1-olefins having from 2 to 8 carbon atoms per molecule. Examples of such monomers include ethylene, propylene, 1-butene, 1-pentene, 3-methyl-1-butene, and the like. The term "polymers" include both homopolymers and copolymers of said mono-1-olefins.

A wide variety of catalyst systems have been employed in the polymerization of mono-1-olefins. One particularly suitable catalyst is described in Hogan et al. U.S. 2,825,721. Another catalyst system suitable for such use are those broadly defined as an organometal and a metal salt. A particularly suitable catalyst for the polymerization of propylene is one which comprises (1) a compound having the formula $R_nMX_m$, wherein R is an alkyl, cycloalkyl, or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M and (1) a halide of a metal of Group IV–B, V–B, VI–B or VIII. The hydrocarbon radicals which can be substituted for R in the aforementioned formula include radicals having up to about 20 carbon atoms each.

Radicals having 10 carbon atoms or less are preferred since the resulting catalyst composition has a greater activity for initiating the polymerization.

A preferred catalyst system employed in the polymerization of propylene in a mass system comprises diethylaluminum chloride and a complex having the approximate formula $3TiCl_3 \cdot AlCl_3$ and prepared by the reaction of Al with $TiCl_4$. The amount of titanium trichloride complex employed is generally in the range of $1.5 \times 10^{-4}$ to $10 \times 10^{-4}$ gm./gm. of monomer.

Although not essential to the conduct of the polymerization, it is often desirable to carry out the polymerization in the presence of elemental hydrogen. When so operating, hydrogen is added in an amount sufficient to provide from 0.15 to 0.40 mol percent hydrogen in the liquid mono-1-olefin phase in the polymerization zone. By operating in this manner, the productivity of the catalyst is increased and certain properties of the polymer, e.g., flexural modulus, are improved.

Subsequent to the polymerization step, a number of methods have been proposed for the removal of the catalyst residue from the polymer, e.g., by extraction with a suitable extractant including aliphatic alcohols, carboxylic acids and hydroxy-substituted carboxylic acids, anhydrides of said acids and mixtures thereof.

Also well suited as extractants are the diketones, particularly alpha-diketones and beta-diketones. These diketones can be defined as being selected from the group consisting of the group of compounds having the formulae:

(1) 

and (2) 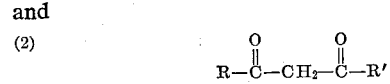

wherein R and R' are hydrocarbon radicals, such as alkyl, cycloalkyl and aryl. Examples of suitable alpha-diketones include the following:

2,3-butanedione,
2,3-pentanedione,
3,4-hexanedione,
4-methyl-2,3-pentanedione,
3,4-heptanedione,
5-methyl-2,3-hexanedione,
2,5-dimethyl-3,4-hexanedione,
2,2,5,5-tetramethyl-3,4-hexanedione,
1,2-cyclopentanedione,
3-methyl-1,2-cyclopentanedione,
1,2-cyclohexanedione,
bibenzoyl,
bi-2-furoyl,
methylphenylglyoxal,
phenylbenzylglyoxal,
4,4'-dimethoxybenzil, and the like.

The following are examples of suitable beta-diketones:

2,3-pentanedione (acetylacetone),
2,4-hexanedione,
2,4-heptanedione,
5-methyl-2,4-hexanedione,
2,4-octanedione,
5,5-dimethyl-2,4-hexanedione,
3-ethyl-2,4-pentanedione,
3,3-diethyl-2,4-pentanedione,
2,2-dimethyl-3-5-nonanedione,
1-cyclohexyl-1,3-butanedione,
5,5-dimethyl-1,3-cyclohexanedione,
1-phenyl-1,3-butanedione,
1-(4-biphenylyl)-1,3-butanedione,
1-phenyl-1,3-pentanedione,
1-phenyl-5,5-dimethyl-2,4-hexanedione,
1,3-diphenyl-1,3-propanedione,
1,4-diphenyl-1,3-butanedione,
1-phenyl-2-benzyl-1,3-butanedione,
1-phenyl-3-(2-methoxyphenyl)-1,3-propanedione,
1-(4-nitrophenyl)-1,3-butanedione,
1-(2-furyl)-1,3-butanedione,
1-(tetrahydro-2-(furyl)-1,3-butanedione, and the like.

A more comprehensive understanding of the invention can be obtained by referring to the drawing which is a flow diagram illustrating a preferred embodiment of the invention.

While the drawing is described with regard to a process in which propylene is polymerized with a specific catalyst system employing a monomer in liquid phase without the addition of more than small amounts of an inert diluent, it is to be understood that it is not intended to limit the invention to this specific embodiment. As used herein, the term "mass polymerization" is used to designate a polymerization which is conducted with the monomer in liquid phase and without the addition of more than small amounts of an inert diluent.

Referring now to the drawing, propylene is charged to reactor 10 through line 11. Prior to use in the polymerization, the propylene is treated by conventional methods in order to remove contaminants such as oxygen, $CO_2$ and moisture. It is also the usual practice to purge the reactor with an inert gas, such as nitrogen, in order to remove such contaminants prior to commencement of the polymerization. Lines 12 and 13, respectively, provide means for charging the catalyst ingredients, namely, the titanium trichloride complex and the diethylaluminum chloride, to the system. It is noted that line 12 is connected to line 11 so that the titanium trichloride enters the reactor along with the liquid propylene. As mentioned above, it has been found to be advantageous to conduct the polymerization in the presence of hydrogen. As shown, the hydrogen enters the propylene feed line through line 14 and is charged to the reactor along with the liquid propylene.

The reactor illustrated in the drawing is a loop-type reactor which comprises two loops. Each loop is composed of two straight legs 16 which may conveniently be in the form of elongated pipe sections. The ends of the legs of the reactor are conveniently interconnected by means of ells 17 so as to provide a continuous flow path through the reactor. The reactor is furnished with an impeller 19 which is operatively connected to a turbine 21. The operation of the impeller provides motive force for flowing the materials through the loop reactor. The vertical legs of the loop reactor are encompassed by heat exchange jackets 22 which are interconnected by means of lines 23. Line 24 connected to the heat exchange jacket associated with one of the outer legs provides means for introducing a coolant such as water. The coolant flows through the heat exchange jackets at a temperature and at a rate such as to maintain a desired polymerization temperature in the reactor. The coolant is removed from the reactor system by means of line 26 which is connected to the other outer leg of the reactor. Although it is often preferred to employ a loop-type reactor, it is to be understood that the polymerization can be conducted in any suitable polymerization zone, such as in a closed reaction vessel provided with a stirring means.

The conditions employed in conducting the polymerization will vary somewhat depending upon the mono-1-olefin utilized. The polymerization temperature is generally in the range of zero to 160° F. In the case of propylene, a particularly suitable temperature range in reactor 10 is in the range of 90 to 160° F. In general, the polymerization is conducted at a temperature such that solid polymer in particle form is obtained in the polymerization. The actual amount of solid polymer formed is also dependent upon the particular catalyst system used. It has been found that the preferred catalyst system as described above produces a very high percentage of solid polymer with a minimum formation of soluble polymer. The pressure employed in reactor 10 is sufficient to maintain the reactants in the liquid phase. In the case of the polymerization of propylene, the lower limit of pressure is about 225 p.s.i.g. at a polymerization temperature of about 90° F. The residence time in reactor 10 can range from about 1 to about 5 hours, with a residence time of about 3 hours being preferred.

The effluent stream recovered from reactor 10 through line 27 comprises solid polymer, catalyst residues, soluble polymer and liquid propylene. The stream usually contains in the range of 25 to 40, preferably 35, weight percent solid polymer. After removal of the effluent through line 27, it is passed through indirect heat exchange means 28 prior to introduction into a lower portion of contact tank 29. In the heat exchange means, the effluent is heated to a temperature which is slightly higher than the temperature employed in reactor 10. Although the effluent may be introduced directly into the contact tank without prior heating, it has been found that catalyst removal is improved if the temperature maintained in the contact tank is slightly higher than the polymerization temperature. In the case of polypropylene, the effluent in line 27 is usually heated to a temperature in the range of 100 to 170° F. The pressure in contact tank 29 is sufficient to maintain the propylene in the liquid phase, and it is usually substantially the same as the pressure in reactor 10. Line 30 provides means for introducing an extractant, e.g., acetylacetone, into the contact tank. Line 30 is connected to line 27 so that the acetylacetone enters the contact tank along with the effluent. In some cases, hydrogen chloride may be evolved and it may be desirable to add propylene oxide or the like to the contact tank.

In contact tank 29 the acetylacetone is thoroughly mixed with the effluent from reactor 10. The contact tank depicted in the drawing, comprises an enclosed vessel having baffle members 31 disposed in the upper and lower portion of the tank. The baffle members are attached to the walls of the tank and are each provided with a central opening through which the shaft or stirring means 32 passes. The positioning of the baffle members in this manner in effect divides the contact tank into upper, intermediate and lower sections. Each of these sections is provided with a stirrer 33 which is attached to the shaft of stirring means 32. It has been found that particularly good contact is obtained between the acetylacetone and the effluent from reactor 10 when utilizing this specific structure.

The extractant, e.g., acetylacetone, and propylene oxide, if desired, can be introduced into line 27 undiluted, or it can be added as a solution in a hydrocarbon which is inert to the reactants. The amount of treating agent added in this manner may range from 1 to 5 times the stoichiometric equivalent, based on the amount of catalyst present. The contact time in contact tank 29 can vary within rather wide limits, e.g., from 5 minutes to 1 hour. However, it is usually preferred to use a contact time in the range of 20 to 30 minutes.

As previously mentioned, heat exchanger 28 provides means for heating the effluent from reactor 10 prior to its introduction into contact tank 29. As an alternative, line 34 provided with indirect heat exchange means 36 furnishes a means for increasing the temperature in the contact tank. When using this procedure, a low-boiling hydrocarbon is heated in heat exchange 36 and then passed into the contact tank in order to raise the temperature therein to a desired level. As the low-boiling hydrocarbon it is usually preferred to employ the monomer, e.g., propylene or a paraffinic hydrocarbon containing from 4 to 6 carbon atoms per molecule, such as n-pentane or n-hexane. Contactor 29 may also be heated by means of a jacket surrounding same through which a heating medium is circulated.

The treated effluent is withdrawn from an upper portion of contact tank 29 through line 37 and is then passed into the upper portion of wash column 38. The treated effluent containing the extractant and catalyst residues is preferably contacted countercurrently with liquid propylene introduced through conduit 39 and removed through conduit 40 with any polymer fines carryover being removed through filter 41. Some soluble polymer is removed by the liquid propylene. The liquid is then passed through conduit 42 to a suitable treating zone for the removal of the extractant so that the liquid propylene may be recycled. Although various light hydrocarbons, particularly paraffinic hydrocarbons containing from 4 to 6 carbon atoms per molecule, such as normal pentane, are employable as the wash liquid, it is preferred to utilize the liquid monomer, such as propylene. Furthermore, because of the improved results obtained with propylene, it is not to be implied that the use of propylene is necessarily equivalent to the use of other materials such as normal pentane for the wash liquid. However, other wash liquids are operable including a mixture of the liquid monomer and a light hydrocarbon as well as mixtures of light hydrocarbons. It is only necessary that the wash liquid be provided at a velocity and a volume sufficient to remove substantially all of the remaining traces of extractant and catalyst residues contained in the slurry of polymer, preferably for a period of time in the range of five minutes to one hour. The pressure maintained in the wash column is sufficient to maintain the liquids, for example liquid propylene, in the liquid phase, preferably in the range of 50–500 p.s.i.a. A slurry of solid polymer in particle form and liquid propylene is then withdrawn from the bottom portion of the wash column through conduit 43 and valve 44 which operates as a pressure letdown valve into flash tank 58 wherein the propylene flashes off. The conduit 43 extending from the valve to the confined zone 46 should be as short as possible. The vapors discharge through conduit 59 into cyclone separator 60 wherein any solid material contained in the gaseous propylene stream is recovered as underflow through line 61 and is usually discarded. The gaseous propylene is recovered as the overflow through line 62 and after suitable purification operations is reused in the process.

Solid polymer in particle form and containing residual amounts of propylene is withdrawn from the bottom of flash tank 58 and falls into a dryer conveyor 63. This conveyor is equipped with a jacket (not shown) through which hot water or other suitable heat exchange fluid can be circulated. The heat exchange fluid is introduced into the jacket through line 65 and is withdrawn through line 66. Conveyor 63 is provided with an auger 64 which is powered by a motor 67. As the polymer solids are removed through the conveyor by means of the auger, propylene is evaporated as the result of the heat added to the moving particles by the hot water circulating through the jacket. The propylene vapors are removed from conveyor 63 through the flash tank 58. This gaseous propylene can thereafter be suitably treated and reused in the process. After the polymer solids are conveyed to the end of conveyor 63 they are passed through rotary valve 69 positioned in conduit 70. The polymer solids then drop into a purge conveyor 72 which contains an auger 73 driven by motor 74. As the polymer solids are moved through conveyor 72, they are contacted with a heated noncombustible gas introduced through line 76. Any suitable non-combustible gas such as carbon dioxide, nitrogen or the like can be utilized. In flowing through conveyor 72, the gas contacts the polymer solids as they are moved therethrough thereby evaporating residual amounts of propylene and also purging previously evaporated propylene. The gases are withdrawn from conveyor 72 through line 77 after which they are flared. Polymer solids substantially free of propylene having an ash content of less than 0.01 weight percent are recovered from purge conveyor 72 through line 78. The polymer so recovered can then be transferred to a suitable storage facility or to subsequent operations such as packaging or pelleting.

As discussed hereinbefore, the slurry of solid polypropylene particles in liquid propylene diluent or the like in conduit 43 is reduced in pressure from very elevated pressures, e.g., 400 p.s.i.a., to substantially atmospheric pressure in flash tank 58 in one simple step by the method of this invention. By "substantially atmospheric pressure" is meant that pressure which is sufficient or necessary to cause the discharge of the polymer and gases from the flash tank to downstream facilities, preferably not more than 20 p.s.i.a.

The slurry in conduit 43 is introduced into a confined zone heated by indirect heat exchange, such as by steam entering through conduit 49 and passing into an annulus 48 formed between the confined zone 47 and the jacket 46 and exiting through conduit 50. As the slurry passes through confined zone 47, it is heated and the liquid hydrocarbon components of the slurry are vaporized resulting in a flow of dry polymer which has a substantially higher velocity than the velocity of the liquid entering the coil.

The temperature in the heating chamber is preferably and most conveniently that of saturated atmospheric steam, that is 212° F. This results in wall temperatures of about 212° F. for the coil. The temperature of the heating chamber must be at least above the boiling point of the liquid at the prevailing pressure and below the softening point of the solid polyolefin, preferably at least 20° F. below the softening point.

Although zone 47 is preferably a pipe of substantially constant diameter, it is within the scope of the invention, since the vaporized liquid expands rapidly at the elevated temperatures, to provide a confined zone 47 having progressively larger cross-sectional area so as to reduce the compression on the gas and thus reduce the velocity of the gas entering the flash tank. This progession in cross-section may be either continuous or discontinuous. As a practical matter it is generally preferred that several lengths of progressively larger nominal internal diameter pipe be butt welded together although any form of connection or means for increasing pipe diameter is employable.

Many changes can be made in the form of the specific confined zone shown within the scope of the invention. For example the confined path in which the slurry is heated and liquid vaporized therefrom may be in the form of multiple passages surrounded by a heating chamber, for example, a number of tubes operated in parallel provided each tube is long enough to permit complete vaporization of liquid entering the tube. The heated tube may be disposed vertically, horizontally or at an angle.

Extremely high velocities are not essential in the heated tubes and operations according to this process. The velocity of the liquid entering the tube may be, for example, in the range of from 0.5 to 50 feet per second. The velocity of the vaporized stream need only be sufficient to be above that at which bridging of the solids in the heating tube may occur. This is a function of the geometry of the design; velocities of at least about 10 feet per second may be generally sufficient. The critical point in each tube is that at which most of the liquid is just evaporated. This results in an increase in the viscosity of the remaining slurry.

It will be understood that in the production of solid polypropylene or similar polyolefins 100 percent removal of hydrocarbon solvent from the powdered polyolefin is not required, since residual amounts of such hydrocarbons are readily removed in the conventional subsequent conversion of the powder to pellets, nibs or the like by extrusion. It is sufficient that the powdery polyolefin be converted to a form which is substantially dry, that is, in which there is no liquid present apart from the particles of polyolefin and insufficient liquid to cause the particles to adhere to each other. A small amount of solid, for example, 0.1 to 0.5 percent is usually very tenaciously associated with the particles by absorption or the like and by retention within the particles. By the process of this invention, polypropylene is produced which contains generally no more than 0.5 percent, often no more than 0.1 percent solvent hydrocarbon. However, even contents of solvent up to 5 percent may be tolerated.

*Example*

Propylene is polymerized in a mass polymerization system in the presence of hydrogen and a catalyst consisting of diethylaluminum chloride and a titanium trichloride complex. The titanium trichloride complex is prepared by reacting titanium tetrachloride with aluminum, and the complex comprises 4.74 weight percent aluminum, 25.0 weight percent titanium, and 69.8 weight percent chlorine. The product obtained from the polymerization is thereafter treated in accordance with the present invention so as to obtain a polymer product having a very low ash content. The polymerization and the treatment of the polymer are conducted in equipment similar to that shown in the drawing and the details of the process are as described hereinbefore in conjunction with the drawing.

The loop reactor is operated at a temperature of 120° F. and a pressure of 400 p.s.i.a. The residence time of the reactant materials in the loop reactor is about 3 hours. An effluent stream containing solid polymer in particle form, liquid propylene, catalyst residues and soluble polymer is removed from the loop reactor through line 27. This effluent stream contains about 30–35 weight percent solid polymer.

The effluent stream recovered from the loop reactor is then passed into contact tank 29. Prior to entering the contact tank, acetylacetone and propylene oxide are added to the stream. The contact tank is operated at a temperature 140° F. and a pressure of 400 p.s.i.a The temperature in the contact tank is maintained at 140° F. by passing hot water through a jacket surrounding the tank. After a contact time of 30 minutes, the treated effluent stream is passed into the wash column 38. In the wash column 38, the solids are contacted countercurrently with liquid propylene introduced through conduit 39. The wash column is maintained at a temperature of 60° F. and a pressure of 400 p.s.i.a. The rate of withdrawal of the slurry from the wash column is controlled by solid level controller 51 which determines the solids interface level within the wash column 38 and resets a timer 52 actuating motor valve 44. Motor valve 44 is an on-off valve operating at a frequency determined by timer 52. The slurry, containing about 50 weight percent of solid polymer in liquid propylene is withdrawn from the lower portion of the wash column 38 through conduit 43 and valve 44 and is introduced into the progressively expanded pipe 47 and subsequently into flash tank 58. Flash tank 58 is operated at a temperature of about 50° F. and a pressure of 20 p.s.i.a. The confined zone 47 is a steam jacketed pipe in the form of a U-tube with no internal obstructions containing 10 feet each of 3, 4, 5, and 6 inch nominal diameter pipe. Alternately, 150 feet of a 3-inch nominal diameter pipe is employable.

Solid polymer containing residual propylene drops from the bottom of flash tank 58 into the dryer conveyor 63 and then into purge conveyor 72 and any remaining propylene is removed through line 78 and is thereafter passed to a suitable storage facility. The polypropylene subsequently recovered contains less than 0.01 weight percent ash.

Various flow rates employed in the above described process are shown hereinbelow in the table. The rates shown in the table are in pounds per stream day and the stream numbers refer to the line numbers shown in the drawing.

TABLE

| Stream No. | 11 | 14 | 12 | 13 | 27 | 30 | 30 |
|---|---|---|---|---|---|---|---|
| | Propylene to Reactor | Hydrogen to Reactor | TiCl₃ to Reactor | DEAC¹ to Reactor | Reactor Effluent | Acetyl acetone | Propylene Oxide |
| Hydrogen | 40 | 40 | | | 40 | | |
| Propylene | 257,160 | | | | 160,900 | | |
| Propane | 17,875 | | | | 17,875 | | |
| Acetyl-acetone | | | | | | 786 | |
| Propylene Oxide | | | | | | | 165 |
| n-Pentane | 1 | | 100 | 240 | 341 | | |
| Soluble polymer | | | | | 4,800 | | |
| Polypropylene | | | | | 91,460 | | |
| DEAC¹ | | | | 80 | 80 | | |
| Titanium trichloride | | | 100 | | 100 | | |
| Catalyst residues | | | | | | | |
| Hydrogen chloride | | | | | | | |
| Ethane | | | | | | | |
| Inert gas | | | | | | | |
| Total, lb./sd | 275,076 | 40 | 200 | 320 | 275,596 | 786 | 165 |

| Stream No. | 37 | 40 | 39 | 43 | 59 | 77 | 76 | 78 |
|---|---|---|---|---|---|---|---|---|
| | Contact Tank Effluent | Wash Tank Overhead | Propylene to Wash Col. | Washed Polymer to Flash Tank | Flash Tank Overhead | Purge Conveyor Off-Gas | Inert Gas to Purge Conveyor | Polymer to Process |
| Hydrogen | 40 | 40 | | | | | | |
| Propylene | 160,900 | 228,900 | 150,000 | 82,000 | 81,800 | 200 | | |
| Propane | 17,875 | 25,875 | 16,000 | 8,000 | 7,980 | 20 | | |
| Acetyl-acetone | 411 | 411 | | | | | | |
| Propylene Oxide | 30 | 30 | | | | | | |
| n-Pentane | 341 | 336 | | 5 | 5 | | | |
| Soluble polymer | 4,800 | 4,800 | | | | | | |
| Polypropylene | 91,460 | | | 91,460 | | | | 91,460 |
| DEAC¹ | | | | | | | | |
| Titanium trichloride | | | | | | | | |
| Catalyst residues | 690 | 690 | | Trace | | | | |
| Hydrogen chloride | 93 | 93 | | | | | | |
| Ethane | 24 | 24 | | | | | | |
| Inert gas | | | | | | 800 | 800 | |
| Total, lb./sd | 276,634 | 261,169 | 166,000 | 181,465 | 89,785 | 1,020 | 800 | 91,460 |

¹ Diethylaluminum chloride.

While certain examples, structures, composition and process steps have been described for purposes of illustration, the invention is not limited to these. Variations and modifications within the scope of the disclosure and the claims can readily be effected by those skilled in the art.

What we claim is:

1. A method of recovering solid polyolefin product from a slurry of said polyolefin in an inert liquid hydrocarbon diluent from a zone maintained at super-atmospheric pressures sufficient to maintain said diluent in the liquid phase comprising vaporizing said diluent by discharging said slurry through a heated confined zone of reduced pressure and providing a progressively larger cross-sectional area in said confined zone for expansion of the vapors passing therethrough, said confined zone being heated sufficiently to vaporize said liquid and form a suspension of substantially dry polyolefin particles in said vapor, discharging said suspension into a solids separation zone maintained at substantially atmospheric pressure and recovering therefrom solid polyolefin product.

2. The process of claim 1 wherein said polyolefin comprises polypropylene and said diluent comprises propylene.

3. A method for recovering solid polypropylene product from a slurry of said polypropylene in liquid propylene from a zone maintained at a pressure in the range of 50 to 500 p.s.i.a. and sufficient to maintain said polypropylene in liquid phase comprising vaporizing said propylene by discharging said slurry from said zone through a heated confined zone of reduced pressure and providing a progressively larger cross-sectional area within said zone for expansion of the vapors passing therethrough, said confined zone being heated by indirect heat exchange sufficiently to vaporize said liquid and form a suspension of substantially dry polypropylene particles in the resultant vapor, said temperature being above the boiling point of said propylene at the prevailing pressure and at least 20° F. below the softening point of said polypropylene, discharging said suspension into a solids separating zone maintained at a pressure in the range of 20 p.s.i.a. to atmospheric and recovering therefrom polypropylene product.

References Cited by the Examiner

UNITED STATES PATENTS

| | | | |
|---|---|---|---|
| 2,908,734 | 10/1959 | Cottle | 260—94.9 |
| 3,002,961 | 10/1961 | Kirschner et al. | 260—93.7 |
| 3,110,707 | 11/1963 | Bua | 260—94.9 |

JOSEPH L. SCHOFER, *Primary Examiner.*

F. L. DENSON, *Assistant Examiner.*